US006992849B2

(12) United States Patent
Yeo et al.

(10) Patent No.: US 6,992,849 B2
(45) Date of Patent: Jan. 31, 2006

(54) METHOD AND APPARATUS FOR MEASURING MAGNETIC WRITE WIDTH OF MAGNETIC HEAD USING BURST PATTERN

(75) Inventors: Chang-dong Yeo, Yongin-si (KR); Jong-yoon Kim, Suwon-si (KR); Cheel-hoon Park, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/621,354

(22) Filed: Jul. 18, 2003

(65) Prior Publication Data

US 2004/0080845 A1 Apr. 29, 2004

(30) Foreign Application Priority Data

Jul. 18, 2002 (KR) ............................... 2002-41989

(51) Int. Cl.
*G11B 5/455* (2006.01)
(52) U.S. Cl. ....................................................... 360/75
(58) Field of Classification Search ................. 360/75, 360/69; 29/593, 603.01, 603.03, 603.09, 29/603.1, 604; 324/207.13, 207.15, 207.16, 324/210, 212
See application file for complete search history.

(56) References Cited

U.S. PATENT DOCUMENTS 6,005,725 A * 12/1999 Emo et al. .................... 360/31

| 6,061,201 A | | 5/2000 | Woods |
|---|---|---|---|
| 6,265,868 B1 | | 7/2001 | Richter |
| 6,404,576 B1 | | 6/2002 | Hamaguchi et al. |
| 6,469,855 B1 | * | 10/2002 | Lamberts et al. ............. 360/75 |
| 6,630,824 B2 | * | 10/2003 | Richter ....................... 324/212 |
| 6,778,343 B2 | * | 8/2004 | Nunnelley ................... 360/31 |
| 2003/0161061 A1 | * | 8/2003 | Lamberts .................... 360/75 |
| 2004/0021975 A1 | * | 2/2004 | Meyer et al. ................ 360/75 |
| 2004/0150903 A1 | * | 8/2004 | Malone, Sr. ................ 360/75 |

FOREIGN PATENT DOCUMENTS

| WO | 01/59785 | 8/2001 |
|---|---|---|
| WO | 02/27887 | 4/2002 |

OTHER PUBLICATIONS

European Search Report for Application No. 03016324.0-2210.

* cited by examiner

*Primary Examiner*—David Hudspeth
*Assistant Examiner*—James L Habermehl
(74) *Attorney, Agent, or Firm*—Staas & Halsey LLP

(57) ABSTRACT

A method and apparatus to determine a magnetic write width of a magnetic head using burst patterns. The method includes seeking a target track on a magnetic disc to write a burst pattern on the target track; seeking tracks adjacent to the target track to write burst patterns on the adjacent tracks, which are offtracked by a predetermined percentage toward the target track, moving the magnetic head along a radial direction of the magnetic disc and measure an output signal of the magnetic head, to create an offtrack profile, and determining an amplitude reduction ratio of the target track from the offtrack profile, to determine a magnetic write width corresponding to the determined amplitude reduction ratio.

19 Claims, 5 Drawing Sheets

METHOD AND APPARATUS FOR MEASURING MAGNETIC WRITE WIDTH OF MAGNETIC HEAD USING BURST PATTERN

CROSS-REFERENCE TO RELATED APPLICATIONS

This application claims the priority of Korean Patent Application No. 2002-41989 filed on Jul. 18, 2002, in the Korean Intellectual Property Office, the disclosure of which is incorporated herein by reference.

BACKGROUND OF THE INVENTION

1. Field of the Invention

The present invention relates to a field of determining a magnetic write width (MWW) of a head of a hard disc drive (HDD), and more particularly, to a method and apparatus to determine a magnetic write width of a head of an assembled hard disc drive.

2. Description of the Related Art

FIG. 1 shows a track profile to measure a magnetic write width of a head of a conventional hard disc drive (HDD). In FIG. 1, a vertical axis represents an output signal of a head and a horizontal axis represents a position of a track.

Conventionally, the magnetic write width of the head was measured before the hard disc drive was assembled. That is, the magnetic write width of the head is not measured during an assembled state of the hard disc drive. The magnetic write width of the head before assembling the hard disc drive is measured using a Guzik spinstand. As shown in FIG. 1, after a track profile is drawn, the magnetic write width is measured on the basis of a predetermined high threshold value and a predetermined low threshold value of the track profile. That is, tangents are drawn, which touch the track profile at a value corresponding to 50% of the average amplitudes in the track profile, thereby allowing the magnetic write width to be determined. In FIG. 1, a reference numeral 110 represents a magnetic write width, and a sum of ranges defined by reference numerals 120 and 130 represents a magnetic read width.

Since the magnetic write width is measured before assembling the hard disc drive according to the related art, the time for testing each of a hard disc drive's components increases, resulting in an increase of the hard disc drive's cost. Further, an adjacent track erase (ATE) feature and the measuring environment, as well as the magnetic write width, are factors that affect tracks adjacent to a target track while the HDD is operating. If the magnetic write width of the head is measured using only the profile of the target track, while disregarding the adjacent tracks, as in the related art, an error between the measured magnetic write width and the magnetic write width of the real HDD may occur.

SUMMARY OF THE INVENTION

The present invention provides a method and apparatus to determine a magnetic write width of a head using an offtrack profile of an output signal of the head reading a burst pattern, which is written on a magnetic disc of a hard disc drive.

The present invention also provides a computer readable recording medium to record a program to carry out the method on a computer.

According to an aspect of the present invention, there is provided a method to determine a magnetic write width of a magnetic head using a burst pattern. The method comprises seeking a target track on a magnetic disc to write the burst pattern on the target track; seeking tracks adjacent to the target track to write burst patterns on the adjacent tracks, which are offtracked by a predetermined percentage toward the target track; moving the magnetic head along a radial direction of the magnetic disc and measuring an output signal of the magnetic head, to create an offtrack profile; and determining an amplitude reduction ratio of the target track from the offtrack profile to determine a magnetic write width corresponding to the determined amplitude reduction ratio.

According to another aspect of the present invention, there is provided an apparatus to determine a magnetic write width of a magnetic head using a burst pattern. The apparatus comprises: a burst pattern write unit that writes burst patterns on tracks on a magnetic disc; a profile creating unit that determines an output signal of the magnetic head along a radial direction of the magnetic disc, to create an offtrack profile; and a magnetic write width determining unit that determines an amplitude reduction ratio of a target track from the offtrack profile to determine the magnetic write width corresponding to the determined amplitude reduction ratio.

Additional aspects and advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Figure 1:
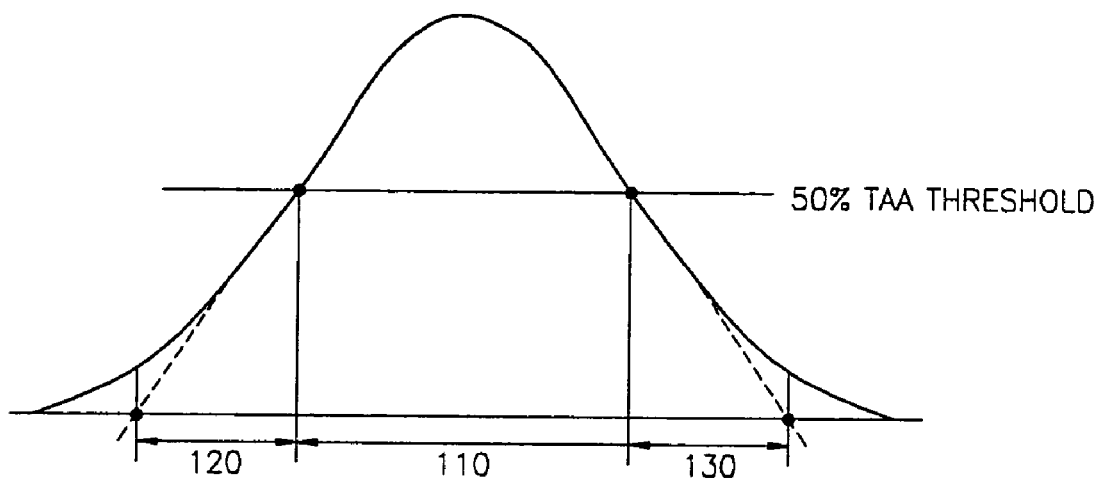
FIG. 1 illustrates a track profile to determine a magnetic write width of a head of a conventional hard disc drive.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
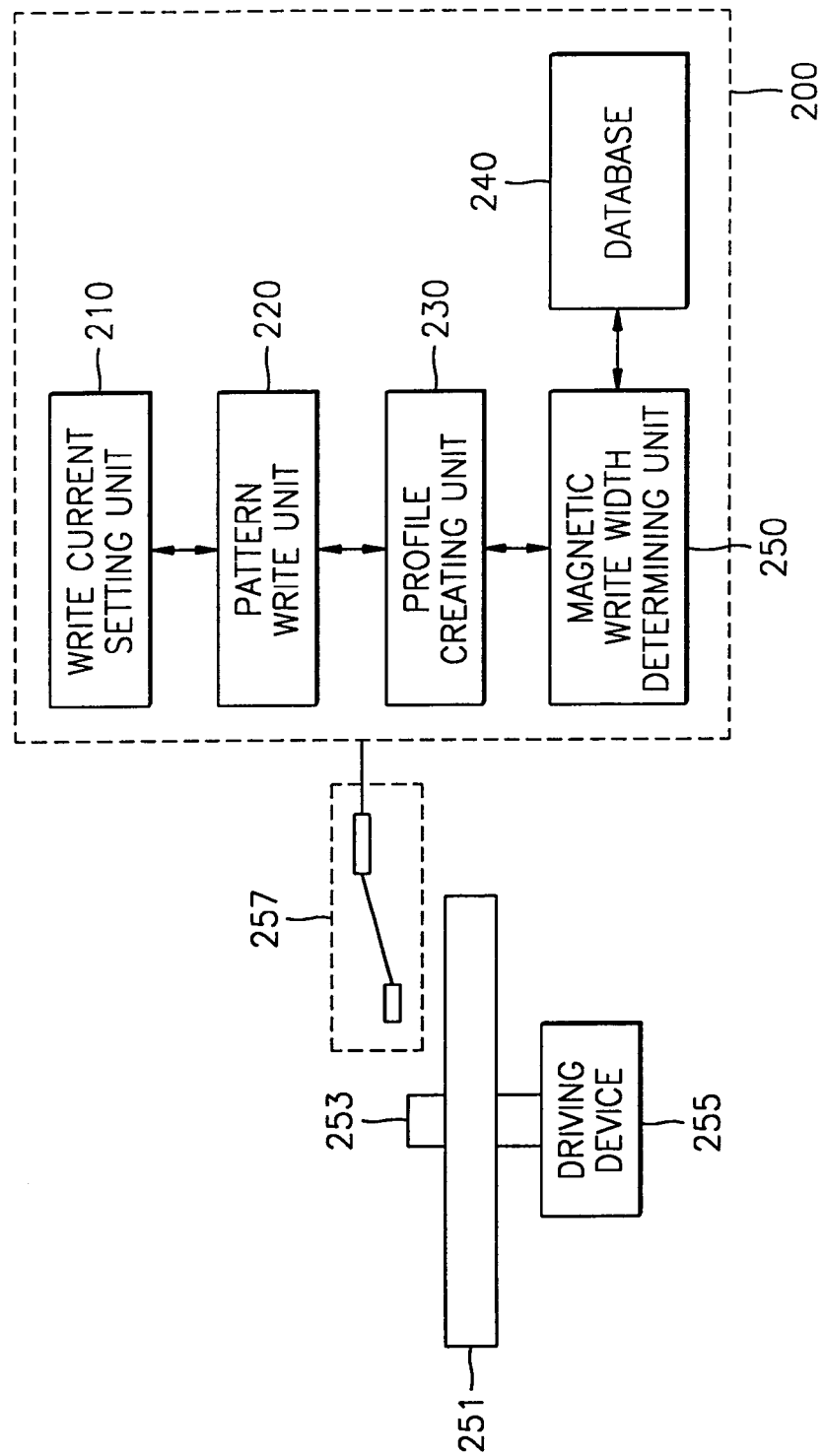
FIG. 2 is a block diagram, in which a magnetic write width determining apparatus is connected with the magnetic head of a hard disc drive.

FIG. 2 is a block diagram, in which a magnetic write width determining apparatus 200 is connected with a magnetic head 257 of a hard disc drive (HDD). The hard disc drive includes a magnetic disc 251, a spindle 253, a driving device 255 that drives the magnetic disc 251, and the magnetic head 257. The magnetic write width determining apparatus 200 has a write current setting unit 210, a pattern write unit 220, a profile creating unit 230, a database 240, and a magnetic write width determining unit 250.

Figure 3:
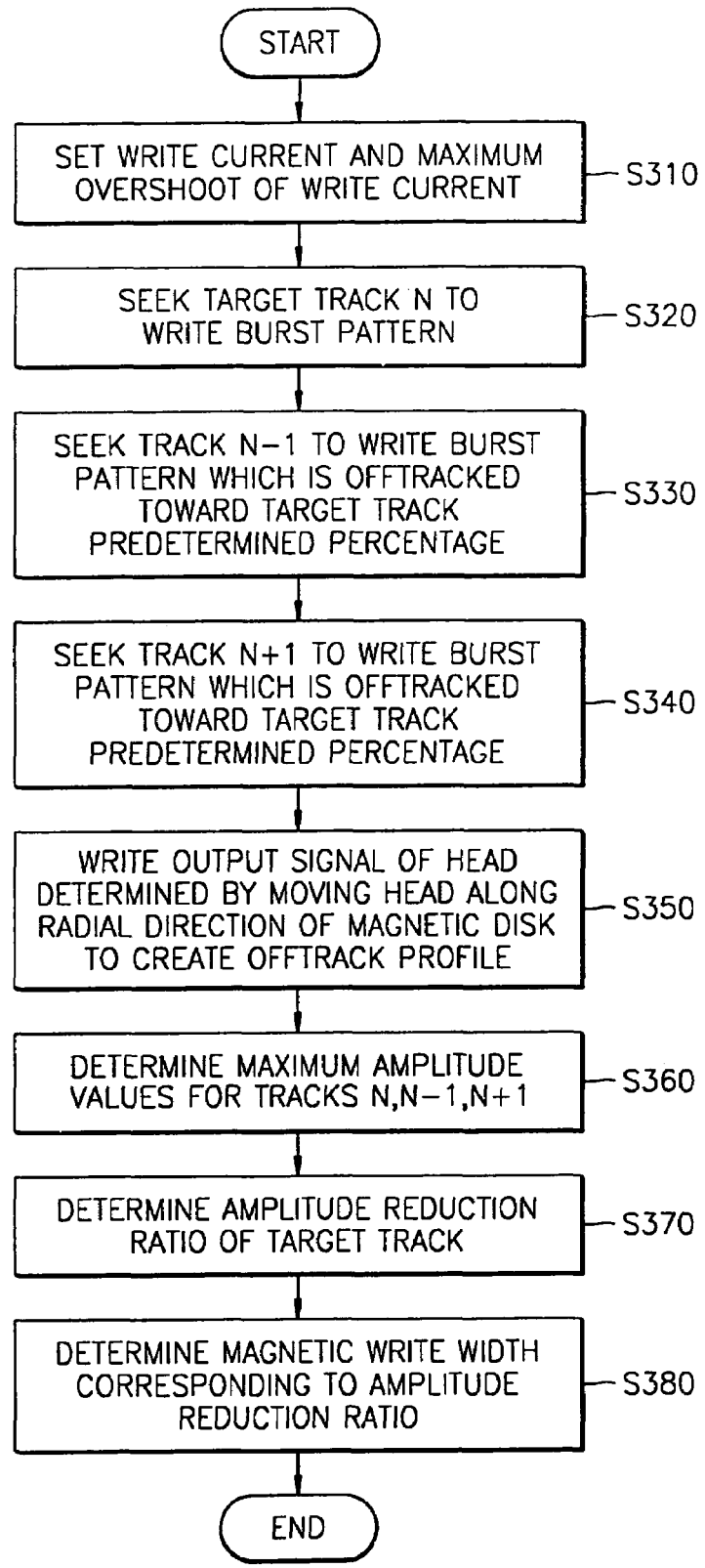
FIG. 3 is a flow chart illustrating a method measuring a magnetic write width of a magnetic head using a burst pattern.
Figure 4:
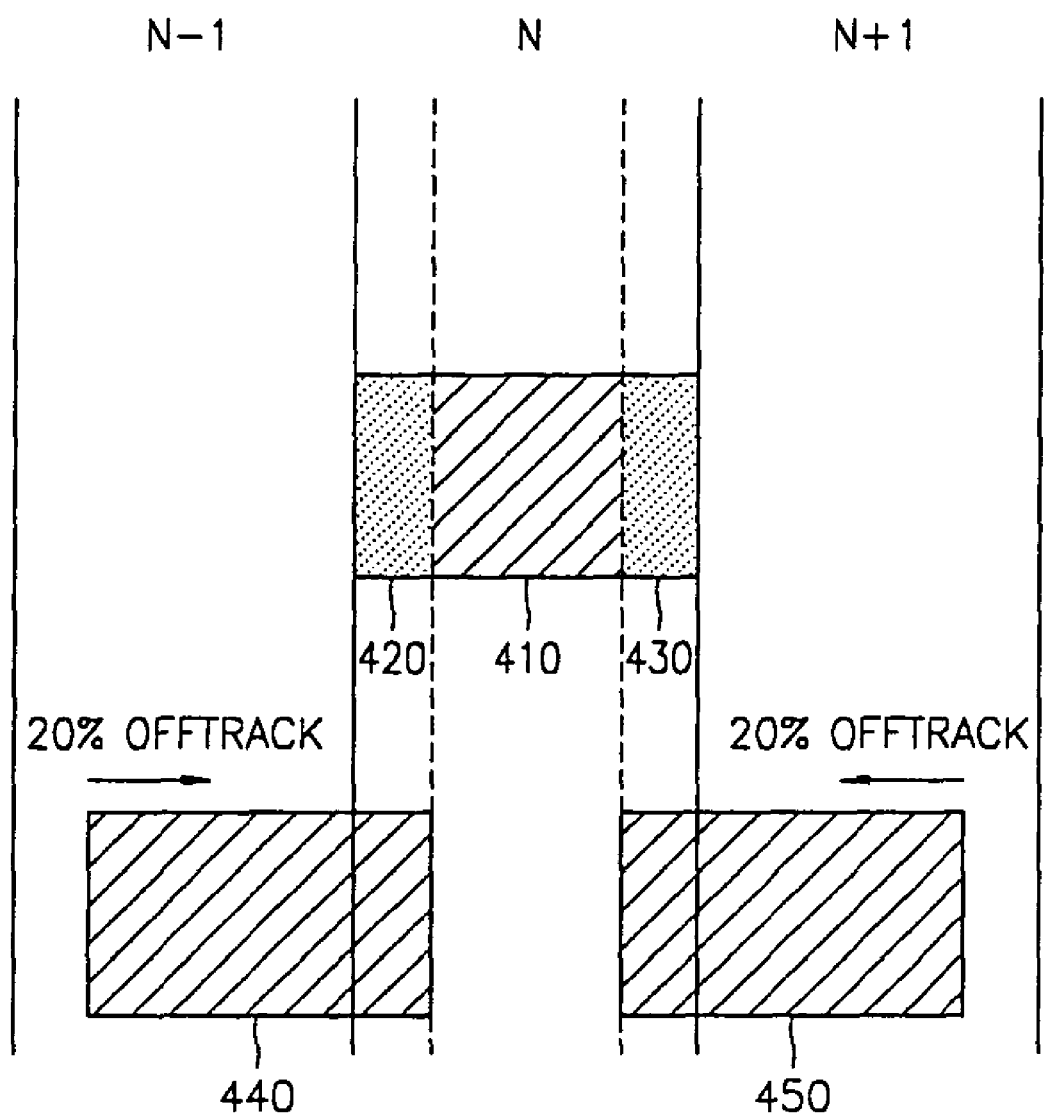
FIG. 4 illustrates a magnetic write width of a target track reduced by the writing of tracks adjacent to the target track.

FIG. 3 is flow chart illustrating a method determining the magnetic write width of the magnetic head using a burst pattern. FIG. 4 illustrates a magnetic write width 410 of a target track N reduced by the writing of tracks N−1 and N+1 adjacent to the target track N, decrements 420 and 430 in the magnetic write width of the target track N overwritten by the writing of the adjacent tracks N−1 and N+1, and areas 440 and 450 of the magnetic write widths of the adjacent tracks N−1 and N+1, which are overtracked by 20% when the burst pattern is written on the magnetic disc and the adjacent tracks N−1 and N+1 are positioned at a 20% offtrack position.

Figure 5:
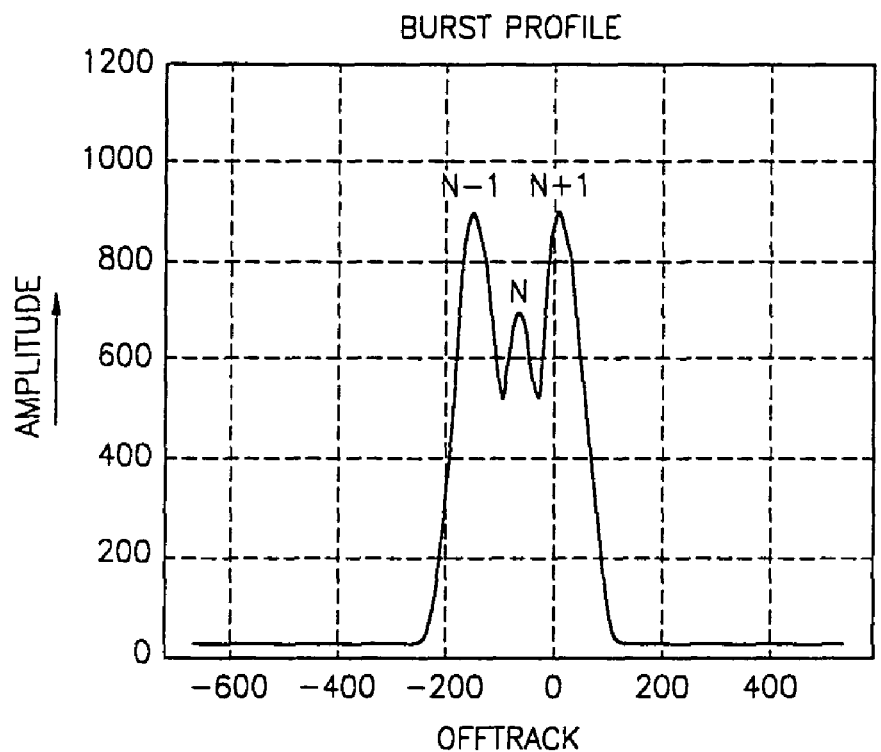
FIG. 5 illustrates a burst profile, in which a burst pattern is written on a target track and offtrack patterns are written on tracks adjacent to the target track, so that an output signal of a magnetic head is measured along a radial direction of the magnetic disc.

FIG. 5 illustrates a burst profile in which a burst pattern is written on the target track N and offtrack patterns are written on the adjacent tracks N−1 and N+1 so that the output signal of the magnetic head 257 is measured along a radial direction of the magnetic disc.

The write current setting unit 210 sets a write current and a maximum overshoot value of the write current, in operation S310. An adjacent track erase (ATE) feature differs according to each magnetic head, and the ATE feature is greatly affected by the write current and the maximum overshoot value of the write current. Since the ATE feature can affect the adjacent tracks irrespective of the magnetic write width, the write current and the maximum overshoot value of the write current are set to the same value to minimize the influence of the ATE feature.

The pattern write unit 220 seeks the target track N on the magnetic disc 251 via the magnetic head 257 to write a burst pattern on the target track N in operation S320. Then the pattern write unit 220 seeks the track N−1 adjacent to the target track N to write a burst pattern on the adjacent track N−1, which is moved to a 20% offtrack position toward the target track N, in operation S330. Further, the pattern write unit 220 then seeks the track N+1 adjacent to the target track N to write a burst pattern on the adjacent track N+1, which is moved to a 20% offtrack position toward the target track N, in operation S340. The pattern write unit 220 writes the burst pattern on the target track N once, and writes the burst patterns ten times on the adjacent tracks N−1 and N+1, respectively.

The profile creating unit 230 determines an output signal of the magnetic head 257 measured by moving the magnetic head 257 along the radial direction of the magnetic disc 251, thereby obtaining an offtrack profile as shown in FIG. 5, in operation S350. As shown in the offtrack profile of FIG. 5, the maximum amplitude of the output signal of the target track N is less than that of the output signal of the adjacent tracks N−1 and N+1. Data for determining the magnetic write widths based on amplitude reduction ratios of the target tracks is stored in the database 240.

The magnetic write width determining unit 250 determines the maximum amplitudes of the target track N and the adjacent tracks N−1 and N+1, in operation S360. The amplitude reduction ratio of the target track N is determined using the following Equation (1), in operation S370.

$$\text{Amplitude Reduction Ratio} = \frac{(Amp_{N-1} + Amp_{N+1})/2 - Amp_N}{(Amp_{N-1} + Amp_{N+1})/2} \quad (1)$$

In Equation (1), AmpN indicates the maximum amplitude value for the target track N, and AmpN−1 and AmpN+1 indicate the maximum amplitude values of the adjacent tracks N−1 and N+1.

After determining the amplitude reduction ratio of the target track N from Equation (1), the magnetic write width of the head during the assembled state of the HDD is determined from the data stored in the database 240, in operation S380.

Figure 6:
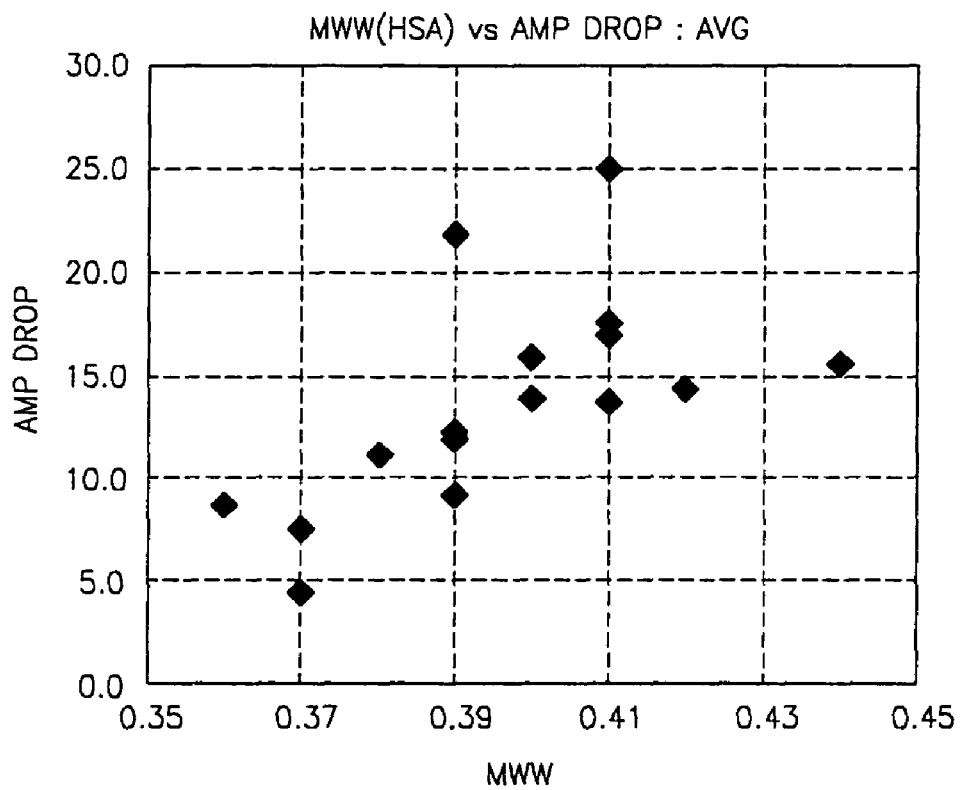
FIG. 6 illustrates a relationship between a determined amplitude reduction ratio of a target track and a magnetic write width.

FIG. 6 shows a relationship between the determined amplitude reduction ratio of the target track N and the magnetic write width. In FIG. 6, a vertical axis represents the amplitude reduction ratio of the target track N (unit: %), and a horizontal axis represents the magnetic write width of the head (unit: μm). The relationship between the amplitude reduction ratio of the target track N and the magnetic write width of the head can be approximated as a linear equation, and the values obtained from this relationship are stored in the database 230. Thus, after determining the amplitude reduction ratio, the magnetic write width is obtained from the relationship values stored in the database 230 and the approximated linear equation.

According to one aspect, the present invention is embodied as a computer readable code on a recording medium capable of being read by a computer. A computer readable recording medium includes all kinds of recording devices, in which data capable of being reproduced by a computer system is stored. The computer readable recording medium may include a ROM, a RAM, a CD-ROM, a magnetic tape, a hard disc, a floppy disc, a flash memory, an optical data storage, and a recording device embodied as a carrier wave form, for example, transmission over the Internet. Further, the computer readable recording medium may be distributed to computer systems connected to a network so that the computer readable recording medium may be stored and carried out as a computer readable code in a distributed computing environment.

As described above, according to the present invention, since a magnetic write width of a HDD, which is an important design parameter affecting the performance of the HDD, is measured in an assembled state of the HDD, the cost for manufacturing the HDD can be reduced, and the magnetic write width of the head can appropriately and easily be set in the HDD.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to determine a magnetic write width of a magnetic head using burst patterns, comprising:
   seeking a target track on a magnetic disc to write a burst pattern on the target track;
   seeking tracks adjacent to the target track to write burst patterns on the adjacent tracks, the adjacent tracks being offtracked by a predetermined percentage toward the target track;
   moving the magnetic head along a radial direction of the magnetic disc and measuring an output signal of the magnetic head, to create an offtrack profile; and
   determining an amplitude reduction ratio of the target track from the offtrack profile to determine the magnetic write width corresponding to the determined amplitude reduction ratio.

2. The method of claim 1, wherein the determining the amplitude reduction ratio of the target track from the offtrack profile to determine the magnetic write width corresponding to the determined amplitude reduction ratio comprises:
obtaining maximum amplitudes of the output signals of each of the target track and the adjacent tracks from the offtrack profile;
determining the amplitude reduction ratio of the target track; and
determining the magnetic write width corresponding to the determined amplitude reduction ratio.

3. The method of claim 2, wherein, the amplitude reduction ratio is determined using the equation:

$$\text{Amplitude Reduction Ratio} = \frac{(Amp_{N-1} + Amp_{N+1})/2 - Amp_N}{(Amp_{N-1} + Amp_{N+1})/2}$$

where, AmpN indicates the maximum amplitude value for the target track, and AmpN−1 and AmpN+1 indicate the maximum amplitude values for the adjacent tracks, respectively.

4. The method of claim 1, further comprising:
setting a write current and a maximum overshoot value of the write current.

5. An apparatus to determine a magnetic write width of a magnetic head using burst patterns, comprising:
a burst pattern write unit that writes burst patterns on tracks on a magnetic disc;
a profile creating unit that measures an output signal of the magnetic head along a radial direction of the magnetic disc, to create an offtrack profile; and
a magnetic write width measuring unit that determines an amplitude reduction ratio of a target track from the offtrack profile to determine the magnetic write width corresponding to the determined amplitude reduction ratio.

6. The apparatus of claim 5, further comprising:
a database in which data to determine the magnetic write width based on the amplitude reduction ratio is stored.

7. A computer readable medium to determine a magnetic write width of a magnetic head using burst patterns, comprising:
a first set of instructions seeking a target track on a magnetic disc and writing a burst pattern on the target track;
a second set of instructions seeking tracks adjacent to the target track and writing burst patterns on the adjacent tracks, respectively, which are offtracked by a predetermined percentage toward the target track;
a third set of instructions moving the magnetic head along a radial direction of the magnetic disc and measuring an output signal of the magnetic head, to create an offtrack profile; and
a fourth set of instructions determining an amplitude reduction ratio of the target track from the offtrack profile and determining the magnetic write width corresponding to the determined amplitude reduction ratio.

8. The computer readable medium of claim 7, wherein the fourth set of instructions comprises:
a fifth set of instructions obtaining maximum amplitudes of the output signals of each of the target track and the adjacent tracks from the offtrack profile;
a sixth set of instructions determining the amplitude ratio of the target track; and
a seventh set of instructions determining the magnetic write width corresponding to the determined amplitude reduction ratio.

9. The computer readable medium of claim 8, wherein: the sixth set of instructions employs the formula $$\text{Amplitude Reduction Ratio} = \frac{(Amp_{N-1} + Amp_{N+1})/2 - Amp_N}{(Amp_{N-1} + Amp_{N+1})/2}$$

where, AmpN indicates the maximum amplitude value for the target track, and AmpN−1 and AmpN+1 indicate the maximum amplitude values for the adjacent tracks.

10. The computer readable medium of claim 7, further comprising:
a fifth set of instructions setting a write current and a maximum overshoot value of the write current.

11. An apparatus to determine a magnetic write width of a magnetic head of an assembled hard disc drive, comprising:
a profile creating unit to measure an output signal of the magnetic head along a radial direction of the magnetic disc to create an offtrack profile; and
a magnetic write width measuring unit to determine an amplitude reduction ratio of a target track from the offtrack profile to determine the magnetic write width corresponding to the determined amplitude reduction ratio, the amplitude reduction ratio being determined using output signals corresponding to a target track and tracks adjacent to the target track.

12. An apparatus to determine a magnetic write width of a magnetic head of a hard disc drive, comprising:
a burst pattern write unit to write burst patterns on tracks on a magnetic disc;
a profile creating unit to measure an output signal of the magnetic head along a radial direction of the magnetic disc to create an offtrack profile; and
a magnetic write width measuring unit to determine an amplitude reduction ratio of a target track from the offtrack profile to determine the magnetic write width corresponding to the determined amplitude reduction ratio,
wherein the hard disc drive is assembled prior to determination of the magnetic write width.

13. The apparatus of claim 12, wherein:
the burst pattern write unit writes burst patterns to the target track and to tracks adjacent to the target track.

14. The apparatus of claim 13, wherein:
the tracks adjacent to the target track are positioned at 20% offtrack positions toward the target track.

15. The apparatus of claim 12, further comprising:
a database in which data to determine the magnetic write width based on the amplitude reduction ratio is stored.

16. A method to determine a magnetic write width of a magnetic head of an assembled hard disc drive, comprising:
moving the magnetic head along a radial direction of the magnetic disc and measuring an output signal of the magnetic head, to create an offtrack profile; and
determining an amplitude reduction ratio of the target track from the offtrack profile and determining the magnetic write width corresponding to the determined amplitude reduction ratio, the amplitude reduction ratio being determined using output signals corresponding to a target track and tracks adjacent to the target track.

17. An apparatus to determine a magnetic write width of a magnetic head of a hard disc drive, comprising:

a burst pattern write unit to write burst patterns on tracks on a magnetic disc;

a profile creating unit to measure an output signal of the magnetic head along a radial direction of the magnetic disc to create an offtrack profile; and a magnetic write width measuring unit to determine an amplitude reduction ratio of a target track from the offtrack profile to determine the magnetic write width corresponding to the determined amplitude reduction ratio.

18. An apparatus to determine a magnetic write width of a magnetic head of an assembled hard disc drive, comprising:

a profile creating unit to measure an output signal of the magnetic head along a radial direction of the magnetic disc to create an offtrack profile, the offtrack profile including output signals corresponding to a target track and tracks adjacent to the target track; and a magnetic write width measuring unit to determine an amplitude reduction ratio of a target track from the offtrack profile to determine the magnetic write width corresponding to the determined amplitude reduction ratio.

19. A method to determine a magnetic write width of a magnetic head of an assembled hard disc drive, comprising:

moving the magnetic head along a radial direction of the magnetic disc and measuring an output signal of the magnetic head, to create an offtrack profile, the offtrack profile including output signals corresponding to a target track and tracks adjacent to the target track; and determining an amplitude reduction ratio of the target track from the offtrack profile and determining the magnetic write width corresponding to the determined amplitude reduction ratio.

* * * * *

UNITED STATES PATENT AND TRADEMARK OFFICE
CERTIFICATE OF CORRECTION

PATENT NO. : 6,992,849 B2
APPLICATION NO. : 10/621354
DATED : January 31, 2006
INVENTOR(S) : Chang-dong Yeo et al.

It is certified that error appears in the above-identified patent and that said Letters Patent is hereby corrected as shown below:

Column 5, line 20, Claim 3, replace "AmpN" with --$Amp_N$--, therefor;

Column 5, line 21, Claim 3, replace "AmpN-1" with --$Amp_{N-1}$--, therefor;

Column 5, line 21, Claim 3, replace "AmpN+1" with --$Amp_{N+1}$--, therefor;

Column 6, line 11, Claim 9, replace "AmpN" with --$Amp_N$--, therefor;

Column 6, line 12, Claim 9, replace "AmpN-1" with --$Amp_{N-1}$--, therefor;

Column 6, line 12, Claim 9, replace "AmpN+1" with --$Amp_{N+1}$--, therefor;

Signed and Sealed this

Fifth Day of December, 2006

JON W. DUDAS
*Director of the United States Patent and Trademark Office*